United States Patent [19]

Nishikawa et al.

[11] Patent Number: 5,356,726
[45] Date of Patent: Oct. 18, 1994

[54] MAGNETIC RECORDING MEDIUM COMPRISING A MAGNETIC LAYER HAVING FERROMAGNETIC POWDER, A SPECIFIED BINDER AND A LUBRICANT COMPOSITION WHICH INCLUDES A SPECIFIED TERTIARY BRANCHED CHAIN FATTY ACID ESTER

[75] Inventors: Yasuo Nishikawa; Kazuko Hanai; Akira Ushimaru, all of Kanagawa; Yuzo Higaki; Tatsuya Yamada, both of Tokyo, all of Japan

[73] Assignee: Fuji Photo Film Co., Ltd., Kanagawa, Japan

[21] Appl. No.: 48,587

[22] Filed: Apr. 19, 1993

Related U.S. Application Data

[63] Continuation of Ser. No. 769,266, Oct. 1, 1991, abandoned.

[30] Foreign Application Priority Data

Oct. 1, 1990 [JP] Japan .................... 2-260488

[51] Int. Cl.$^5$ ................................. G11B 5/00
[52] U.S. Cl. .................... 428/694 BP; 428/694 BG; 428/900; 252/56 S
[58] Field of Search ......... 428/694, 695, 900, 694 BP, 428/694 BG; 252/56 R, 56 S

[56] References Cited

U.S. PATENT DOCUMENTS

| | | | |
|---|---|---|---|
| 3,341,574 | 9/1967 | Taylor | 252/56 S |
| 4,960,685 | 10/1990 | Bowne | 430/505 |
| 5,030,521 | 7/1991 | Nishikawa et al. | 428/694 |
| 5,049,448 | 9/1991 | Ohya et al. | 428/409 |

*Primary Examiner*—Stevan A. Resan
*Attorney, Agent, or Firm*—Sughrue, Mion, Zinn, Macpeak & Seas

[57] ABSTRACT

A magnetic recording medium high in storage stability and excellent in running properties and durability over a wide range of temperature and humidity, which comprises a non-magnetic support having a magnetic layer formed thereon, in which the magnetic recording layer contains a tertiary branched chain fatty acid ester represented by the following general formula ( I ):

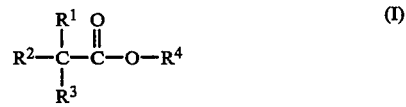

wherein each of $R^1$, $R^2$ and $R^3$ independently represents a hydrocarbon group having 1 to 18 carbon atoms, and $R^4$ represents a hydrogen group having 1 to 24 carbon atoms, provided the total number of carbon atoms in the ester is 12 to 40.

4 Claims, No Drawings

{MAGNETIC RECORDING MEDIUM COMPRISING A MAGNETIC LAYER HAVING FERROMAGNETIC POWDER, A SPECIFIED BINDER AND A LUBRICANT COMPOSITION WHICH INCLUDES A SPECIFIED TERTIARY BRANCHED CHAIN FATTY ACID ESTER

This is a continuation of U.S. application Ser. No. 07/769,266, filed Oct. 1, 1991, now abandoned.

FIELD OF THE INVENTION

The present invention relates to a magnetic recording medium comprising a non-magnetic support provided with a magnetic recording layer (hereinafter also referred to as a magnetic layer) mainly composed of a ferromagnetic powder and a binder or, alternatively composed of a thin ferromagnetic metal film. More particularly, the present invention relates to a magnetic recording medium high in storage stability and excellent in running properties and durability over a wide range of temperature and humidity.

BACKGROUND OF THE INVENTION

For magnetic recording media, demands toward high density recording have increased, and it has been known that the surfaces of magnetic layers can be smoothened as a means for attaining higher density recording capability.

However, when the surfaces of the magnetic layers are so smoothened, the coefficient of friction between the magnetic layer and contacted parts of the running system is increased. This results in damage to the magnetic layer of the magnetic recording media including even the separation of the magnetic layer in extreme cases after only a short period of time of usage thereof.

In order to cope with this problem of reduced running durability, lubricating agents such as fatty acids, fatty acids esters, hydrocarbons and silicone compounds have previously been used.

When the surfaces of the magnetic layers become very smooth, the amount of such lubricating agents existing on the surfaces of the magnetic layers is required to be strictly controlled. Namely, the excess lubricating agents directly lead to an increase in running friction. On the other hand, an insufficient amount of lubricating agents cause deterioration of durability. The lubricating agents have therefore been used in a manner optimizing the addition amount for each kind of lubricant thereof. In particular, the fatty acid esters improve fluid lubricating characteristics, and it is important to control the amount thereof on the surfaces of the magnetic layers.

Recently, with the popularization and expanded usage of flexible disk drive units for civilian use such as for video tape recorders (VTR), personal computers and word processors, environmental conditions under which magnetic recording media are used have been expanded. For example, there is an increased use of the media under conditions of low temperature and low humidity or under conditions of high temperature and high humidity. The magnetic recording media are nonetheless still required to be stable in running durability and storage stability, even under the severe environmental conditions under which they are expected to be used. However, the lubricating agents previously known in the art are not sufficient for such purposes.

For example, JP-A-58-218038 (the term "JP-A" as used herein means an "unexamined published Japanese patent application") and JP-A-63-261526 disclose the use of fatty acid esters as lubricating agents in coating type magnetic recording media comprising non-magnetic supports provided with magnetic layers mainly composed of ferromagnetic powders and binders. However, the fatty acid esters described in these Japanese patent applications are easily hydrolyzed under the severe environmental conditions of high temperature and high humidity which, as a result, introduces the problems that storage durability is deteriorated and that sufficient running durability can not be obtained. Further, a problem is encountered in that sufficient running durability cannot be obtained under the severe environmental conditions of low temperature and low humidity.

The above-described problems become even more serious in thin metal film type magnetic recording media having thin ferromagnetic metal layers. These thin ferromagnetic metal layers are formed by vapor deposition methods such as vacuum deposition, sputtering and ion plating, or plating methods such as electroplating and electroless plating, as magnetic layers, are free of binders, and are excellent in characteristics for high density recording.

The thin metal film type magnetic recording media are also put in a high-speed motion relative to magnetic heads in the course of recording, reproduction and erasing modes. In that case, the magnetic recording media have to run smoothly and stably. At the same time, wear or breakage due to the contact with the heads needs to be avoided. However, the thin metal film type magnetic recording media have smoother, thinner magnetic layers than the above-described coating type magnetic recording media, so that the problem of providing adequate running durability becomes more significant.

As described above, in common to both the coating type magnetic recording media and the thin metal film type magnetic recording media, it has been strongly desired to develop novel lubricating agents which are both higher in storage stability and more improved in running durability over a wide range of temperature and humidity conditions as compared to the conventional lubricating agents.

SUMMARY OF THE INVENTION

It is therefore an object of the present invention to provide an excellent magnetic recording medium which is excellent in storage stability and which exhibits stable running durability, even under the severe conditions of high temperature and high humidity or low temperature and low humidity.

The present inventors have intensively investigated lubricating agents in order to solve the above-described problems of the prior art. As a result, the present inventors have discovered that excellent storage stability and environmental adaptability, which could not be attained by the conventional lubricating agents can be obtained by a tertiary branched chain fatty acid ester represented by the following general formula:

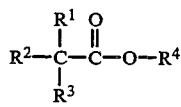

(I)

wherein each of $R^1$, $R^2$ and $R^3$ independently represents a hydrocarbon group having 1 to 18 carbon atoms, and $R^4$ represents a hydrogen group having 1 to 24 carbon atoms, and provided that the total number of carbon atoms in the tertiary branched chain fatty acid ester is 12 to 40, and preferably 12 to 36.

DETAILED DESCRIPTION OF THE INVENTION

Although the functional mechanism associated with the tertiary branched chain fatty acid esters of the present invention is not entirely understood, the following mechanism is considered to occur.

The present invention is characterized by an ester of a tertiary branched chain fatty acid and an aliphatic alcohol, and with the tertiary branched chain fatty acid having three hydrocarbon substituent groups at the carbon atom to which the carbonyl group is linked, as represented by general formula (I). Hydrolysis of an ester linkage is carried out by an attack of an $OH^\ominus$ ion or an $H_3O^\oplus$ ion on a carbonyl group of the ester linkage. When a bulky tertiary branched chain type group is present adjacent to the carbonyl group, as in the present invention, it is believed that pronounced steric hindrance may contribute to the difficulty of hydrolysis of the ester linkage.

On the other hand, in the conventional fatty acid esters used as the lubricating agents, the effect of preventing hydrolysis of the ester linkage by steric hindrance, such as obtained with the lubricating agent of the present invention, is scarcely observed or the effect is nominal.

For example, JP-A-58-218038 discloses the use of esters of saturated branched chain fatty acids and monohydric aliphatic alcohols as the lubricating agents. However, only secondary branched chain fatty acids, each of which has two hydrocarbon substituent groups and one carbon atom at the carbon atom to which the carbonyl group is linked, are specifically described as the saturated branched chain fatty acids therein. Such fatty acid esters exhibit little steric hindrance as compared to the tertiary branched chain fatty acid esters of the present invention. When the secondary branched chain fatty acids are stored under the circumstances of high temperature and humidity, the ester linkages cannot be sufficiently prevented from being hydrolyzed. Further, the lubricity is deteriorated by hydrolysis which increases the coefficient of friction ($\mu$ value), which results in increased scraping of the binders.

On the other hand, even when the tertiary branched chain fatty acid esters of the present invention are stored under conditions of high temperature and humidity such as 60° C. and 85% RH, these tertiary branched chain fatty acid esters are difficult to be hydrolyzed, so that high reproduced output is maintained. Further, even when tertiary branched chain fatty acid esters of the present invention are stored under the circumstances of high temperature and humidity such as 40° C. and 85% RH, an increase in the coefficient of friction is restrained to keep the coefficient of friction desirably low. As a result, excellent running durability is obtained. Furthermore, since the tertiary branched chain fatty acid esters of the present invention are low in melting point, they are liable to exhibit excellent lubricating characteristics even under conditions of low temperature and humidity, such as 5° C. and 10% RH.

JP-A-63-261526 discloses that esters of straight chain fatty acids and of secondary tertiary aliphatic alcohols are used as the lubricating agents, and that stable, excellent running durability is obtained even if changes in temperature and humidity take place. In the examples therein, however, the coefficient of friction is measured under the conditions of 23° C. and 70% RH which are relatively mild as compared to the extreme conditions addressed in the present invention. In the esters described in JP-A-63-261526, the secondary or tertiary bulky aliphatic alcohols are used as alcohol moieties. However, each of these bulky groups is linked to the carbonyl group of the ester linkage through an oxygen atom. Such groups provide little in steric hindrance and are liable to be hydrolyzed, particularly as compared to the bulky tertiary branched chain type groups directly linked to the carbonyl groups as in the present invention. Further, the straight chain fatty acids constituting the esters described in JP-A-63-261526 are relatively high in melting point as compared to the tertiary branched chain fatty acids of the present invention. The formation of fatty acids by hydrolysis in JP-A-63-261526 is therefore apt to produce a white powder form of the fatty acid. For this reason, fluid lubricating characteristics are deteriorated and low temperature lubricating characteristics are liable to be also deteriorated in JP-A-63-261526.

With these shortcoming of the prior art in mind, the present invention will hereinafter be described in more detail.

As the compounds used as the lubricating agents in the present invention, any compounds can be selected as long as they are the compounds represented by the above-described general formula (I), and can be independently selected from isomer structures of the hydrocarbon groups represented by $R^1$, $R^2$ and $R^3$ (branched chain or straight chain), and can be independently selected from various chain structures of hydrocarbon groups represented by $R^4$ (branched chain or straight chain) and further, the hydrocarbon groups can be independently selected from either saturated or unsaturated structures.

As the tertiary branched chain fatty acids used for synthesis of the tertiary branched chain fatty acid esters represented by general formula (I) of the present invention, tertiary branched chain fatty acids produced by the Koch method using olefins as described in JP-A-49-54296 and OSAKA KOGYO GIJUTSU SHIKEN-SHO HOKOKU p356, 1-76 (1979) can generally be employed. Depending upon the kind of olefin used and the manufacturing method, the hydrocarbon groups represented by $R^1$, $R^2$ and $R^3$ are obtained as mixtures of various combined alkyl groups.

Examples of the hydrocarbons represented by $R^1$, $R^2$ and $R^3$ include straight chain atkyl groups such as methyl, ethyl, propyl, butyl, pentyl, hexyl, heptyl, octyl, nonyl and decyl, and branched chain alkyl groups such as isopropyl, isobutyl, isopentyl, isohexyl, isoheptyl, isooctyl, isononyl and isodecyl.

As examples of these tertiary branched fatty acids, Versatic 5, Versatic 10, Versatic 911 and Versatic 1516 manufactured by Shell Chemical Co. Ltd., Equacid 9 and Equacid 13 manufactured by Idemitsu Petrochemicals Co. Ltd., and neodecanoic acid manufactured by Exxon Corp. are commercially available and advantageously used.

As described above, the hydrocarbon groups represented by $R^1$, $R^2$ and $R^3$ are obtained as the complicated mixtures of various combined alkyl groups. For example, Equacid 9 manufactured by Idemitsu Petrochemicals Co. Ltd. is mainly composed of the following three components:

(1) The fatty acid wherein $R^1$ is $CH_3$, and $R^2$ and $R^3$ are i -$C_3H_7$ (2) The fatty acid wherein $R^1$ is $CH_3$, $R^2$ is $C_2H_5$, and $R^3$ is t-$C_4H_9$ (3) The fatty acid wherein $R^1$ and $R^2$ are $CH_3$, and $R^3$ is neo-$C_5H_{11}$ In general formula (I), $R^4$ indicates a hydrocarbon group having 1 to 24 carbon atoms, and preferably a hydrocarbon group having 8 to 18 carbon atoms. Desirable examples of such hydrocarbon groups include saturated straight chain alkyl groups such as octyl, nonyl, decyl, dodecyl, tetradecyl, hexadecyl and octadecyl; saturated branched chain alkyl groups such as isooctyl, isononyl, isodecyl, isododecyl, isotetradecyl, isohexadecyl, isooctadecyl and isotetracosyl; and unsaturated alkyl groups such as hexadecenyl and octadecenyl.

As alcohols used for synthesis of the tertiary branched chain fatty acids represented by general formula (I), when $R^4$ has a branched chain structure, any of 2-position branched chain type alcohols (for example, 2-ethylhexyl alcohol), branched chain alcohols synthesized by the oxo method of carbonylating α-olefins as described in *Ulmann's Encyclopedia Industrial Chemistry*, A10, p290, branched chain alcohols synthesized by the Guerbet method of dimerizing alcohols, and isostearyl alcohol derived from methyl branched chain isostearic acid formed as a by-product on thermal catalytic polymerization isomerization of oleic acid, as described in J. AM. OIL CHEMISTS' SOC., November 1979 (vol. 56 p823A), are effective.

The total number of carbon atoms in the tertiary branched chain fatty acid esters of the present invention is 12 to 40, and preferably 12 to 36.

When the total number of carbon atoms is less than 12, the vapor pressure is too low, and the intended lubricating characteristics can not be obtained. On the other hand, when the total number of carbon atoms exceeds 40, the viscosity is too high, and the lubricating characteristics are deteriorated.

More preferably, the tertiary branched chain fatty acid esters of the present invention have a molecular weight of 340 or more and a solidifying point of 25° C. or less.

Specific synthesis examples of the tertiary branched fatty acid esters of the present invention are hereinafter shown, but the scope of the present invention is not limited thereto.

SYNTHESIS EXAMPLE 1

An egg-plant type flask was charged with 110g of Equacid 13 (neo $C_{13}$ acid) manufactured by Idemitsu Petrochemicals Co. Ltd. and 150g of thionyl chloride, followed by reaction at 75° C. for 4 hours using benzene as a solvent. After cooling, distillation was carried out to obtain about 100g of neo $C_{13}$ acid chloride.

An egg-plant type flask was charged with 17g of n-lauryl alcohol and 9g of triethylamine, and a chloroform solution of 20g of neo $C_{13}$ acid chloride obtained above was added dropwise thereto. After completion of the dropping, reaction was conducted at 40° to 50° C. for 24 hours. The reaction product was cooled, followed by concentration.

After concentration, the product was washed 4 times with water, and dried under reduced pressure to obtain 30g of a desired compound. The resulting lauryl ester of neo $C_{13}$ acid had an acid value of 0.3 and a solidifying point of −5° C.

SYNTHESIS EXAMPLES 2 to 9

Tertiary branched chain fatty acid esters shown in Table A were synthesized in a manner similar to that of Synthesis Example 1. The n-lauryl ester of neo $C_{13}$ acid obtained in Synthesis Example 1 is also shown together in Table A below.

TABLE A

| Synthesis Examples | Tertiary Branched Chain Fatty Acid Ester | Raw Material | Acid Value | Solidifying Point (°C.) |
|---|---|---|---|---|
| 1 | n-Lauryl ester of neo $C_{13}$ acid | Equacid 13 | 0.3 | −5 |
| 2 | Heptyl neopentanoate | Versatic 5 | 0.1 | −20 or less |
| 3 | Octyl neotridecanoate | Equacid 13 | 0.6 | −20 or less |
| 4 | Lauryl neononanoate | Equacid 9 | 0.4 | −20 or less |
| 5 | Cetyl neotridecanoate | Equacid 13 | 0.8 | 23 |
| 6 | Oleyl neodecanoate | Versatic 10 | 0.5 | −20 or less |
| 7 | Heptyl undecyl neotridecanoate | Equacid 13 | 0.2 | −20 or less |
| 8 | 2-Octyl dodecyl neohexadecanoate | Versatic 1516 | 0.8 | −20 or less |
| 9 | 2-Decyl tetradecyl neohexadecanoate | Versatic 1516 | 0.8 | −20 or less |

In the present invention, when the magnetic recording media are coating type magnetic recording media, methods for retaining the tertiary branched chain fatty acid esters represented by general formula (I) in or on the magnetic layers include methods of incorporating the fatty acid esters of general formula (I) in the magnetic layers by adding them to and blending with the magnetic coating compositions and methods of coating the magnetic layers with the fatty acid esters of general formula (I) as top coats. For example, when the magnetic recording media are thin metal film type magnetic recording media, the magnetic layers are coated with the fatty acid esters of general formula (I) as top coats.

Methods for forming the top coats on the magnetic layers include (1) the method of dissolving the fatty acid ester of general formula (I) in an organic solvent and coating (bar coating or gravure coating) or spraying (spray coating) the resulting solution on the surface of magnetic layer, followed by drying; (2) the method of melting the fatty acid ester of general formula (I) to coat the surface of the magnetic layer therewith; (3) the method of dissolving the fatty acid ester of general formula (I) in an organic solvent and impregnating the magnetic recording medium with the resulting solution to allow the fatty acid ester to be adsorbed by the surface of the magnetic layer (dip coating); and (4) Langmuir-Blodgett's method. Examples of the organic solvent include hexane, methyl ethyl ketone, acetone, ethyl acetate, butyl acetate, methyl isobutyl ketone, methanol, ethanol, ethyl ether, methyl cellosolve acetate, dioxane, toluene, and xylene.

In the case of the coating type magnetic recording media having a single magnetic layer the tertiary branched chain fatty acid ester represented by general formula (I) is incorporated in the magnetic layer in an amount of 0.5 to 10% by weight, preferably 0.8 to 3.0% by weight, based on the amount of magnetic substances in the magnetic layer. When the magnetic layer structure has a multilayer arrangement of two or more superposed layers, it is appropriate to use the fatty acid esters of general formula (I) in an amount of 0.5 to 20% by weight, preferably 0.5 to 5.0% by weight, based on the amount of magnetic substances in the whole magnetic layers containing the fatty acid esters. When the magnetic layer structure has such a multilayer arrangement, the fatty acid esters of general formula (I) are desirably contained at least in the uppermost layers (namely, the layers farthest removed from the non-magnetic layers such as the support layer).

Further, when the top coats are formed on the surfaces of the coating type or thin metal film type magnetic recording media, it is appropriate to add the fatty acid esters of general formula (I) so as to give an amount of 2 to 50 mg/m$^2$, preferably 2.5 to 13 mg/m$^2$, after coating and drying.

If the fatty acid esters of general formula (I) are used in an amount exceeding the above upper range amount endpoints, the lubricating agent exists on the surface in an excessive amount may cause troubles such as sticking, but also to plasticize the binders contained in the magnetic layer when the fatty acid esters are incorporated in the magnetic layer, thereby reducing the durability. If the amount is less than the above-described lower range amount endpoints, the lubricating agents exist on the surfaces in an insufficient amount so that a sufficient lubricating effect may not be obtained.

In the present invention, lubricating agents previously known in the art can optionally be used in combination with the tertiary branched chain fatty acid esters represented by general formula (I). The lubricating agents which can be used in combination with the fatty acid esters of the present invention include saturated or unsaturated fatty acids (for example, myristic acid, stearic acid and oleic acid), metal soaps thereof, higher fatty acid amides, other fatty acid esters (for example, fatty acid esters with polyhydric alcohols such as sorbitan and glycerol, and esterified products of polybasic acids, as well as various kinds of monoesters), higher aliphatic alcohols, monoalkyl phosphates, dialkyl phosphates, trialkyl phosphates, paraffins, silicone oils, animal and vegetable oils, mineral oils, higher aliphatic amines, inorganic fine particles of graphite, silica, molybdenum disulfide, tungsten disulfide and the like, resin powders such as powders of polyethylene, polypropylene, polyvinyl chloride, ethylene-vinyl chloride copolymers and polytetrafluoroethylene, α-olefin polymers, unsaturated aliphatic hydrocarbons which are liquid at room temperature, fluorocarbons and fluorinated polyethers.

The amount of these lubricating agents used in combination with the fatty acid esters of the present invention varies depending on their particular modes of use and are appropriately selected. It is however desirable that the above lubricating agents are generally used in an amount of 0.1 to 2 times that of the fatty acid esters of general formula (I) of the present invention.

The coating type magnetic recording media suitable for the present invention are hereinafter described.

The coating type magnetic recording media are magnetic recording media having magnetic layers mainly containing ferromagnetic powders and binders arranged on non-magnetic supports.

In the present invention, the ferromagnetic powders used in the magnetic recording media include ferromagnetic powders conventionally known such as γ-iron oxide series ferromagnetic powders, Co-containing γ-iron oxide series ferromagnetic powders, ferromagnetic chromium dioxide powders, ferromagnetic metal or alloy powders, iron nitride series ferromagnetic powders, and ferromagnetic powders of hexagonal ferrites such as barium ferrite and strontium ferrite. Such ferromagnetic powders can be produced by the well known methods.

Although there is no particular restriction on the size and surface treatment of these ferromagnetic powders, it is preferred from the viewpoint of electromagnetic characteristics that the crystallite size (measured by X-ray diffraction) is 45 nm or less.

There is no particular restriction on the shape of the ferromagnetic powders. Usually, a circular, granular, dice-like ellipsoidal and tabular particles can be used.

The binders constituting the magnetic layers are selected from known binders which have conventionally been used as the binders for the coating type magnetic recording media. Specific examples of the binders include vinyl chloride-vinyl acetate copolymers; copolymers of vinyl chloride and vinyl acetate with vinyl alcohol, maleic acid and/or acrylic acid; vinyl chloride-vinylidene chloride copolymers; vinyl chloride-acrylonitrile copolymers; ethylene-vinyl acetate copolymers; cellulose derivatives such as nitrocellulose resins; acrylic resins; polyvinyl acetal resins; polyvinyl butyral resins; epoxy resins; phenoxy resins; polyurethane resins; and polycarbonate-polyurethane resins. In order to further increase the dispersibility and durability, it is preferred that polar groups such as an epoxy group, —NH$_2$, —OH, —COOM, —SO$_3$M, —OSO$_3$M, —PO$_3$M$_2$ and —OPO$_3$M$_2$ (in the formulae immediately above, M represents a hydrogen atom, an alkali metal or ammonium, and when one group contains more than one M, the Ms may be the same or different). The content of such a polar group is preferably $1 \times 10^{-3}$ to $1 \times 10^{-7}$ equivalent per g of binder, and more preferably $1 \times 10^{-4}$ to $1 \times 10^{-6}$ equivalent per g of binder. It is further desirable from the standpoint of providing improvements in dispersibility and durability that at least one of resin, which accounts for 5% by weight or more of the total amount of resin used as the binder, contains at least one of the above-described polar groups.

The polymer binders listed above can be used alone or can be used as mixtures of several kinds thereof. Known isocyanate crosslinking agents can often be added thereto, followed by hardening treatment.

Binder systems hardenable by radiation exposure in which acrylate oligomers and monomers are used as the binders can also be applied to the present invention.

The content of the total amount of binders contained in the magnetic layers of the magnetic recording media of the present invention is usually 10 to 100 parts by weight per 100 parts by weight of ferromagnetic powder, and preferably 20 to 40 parts by weight.

In the present invention, there is no particular restriction on the non-magnetic support used, and conventional materials can be employed. The materials for forming the non-magnetic supports include polyesters such as polyethylene terephthalate and polyethylene 2,6-naphthalate; polyolefins such as polyethylene and polypropylene; cellulose derivatives such as cellulose triacetate; and resins such as polycarbonates, polyimides and polyimideamides. These supports may previously be metallized with metals such as aluminum, if desired.

Although there is also no particular restriction on the thickness of the non-magnetic supports, the thickness thereof is generally 3 to 100 μm. It is preferred that the supports have a thickness of 3 to 20 μm in the case of magnetic tapes, and a thickness of 20 to 100 μm in the case of magnetic disks.

It is preferred that the magnetic layers of the magnetic recording media of the present invention further contain inorganic particles having a Mohs' hardness of 5 or more.

There is no particular restriction on the inorganic particles to be used, as long as the Mohs' hardness thereof is 5 or more. Examples of the inorganic particles having a Mohs' hardness of 5 or more include $Al_2O_3$ (Mohs' hardness: 9), TiO (Mohs' hardness: 6), $TiO_2$ (Mohs' hardness: 6.5), $SiO_2$ (Mohs' hardness: 7), $SnO_2$ (Mohs' hardness: 6.5), $Cr_2O_3$ (Mohs' hardness: 9) and α-$Fe_2O_3$ (Mohs' hardness: 5.5). These inorganic particles can be used alone or in combination. The inorganic particles having a Mohs' hardness of 8 or more are particularly preferred. When the inorganic particles having a Mohs' hardness of less than 5 are used, the inorganic particles easily drop out of the magnetic layers and have little abrasive action to the magnetic heads. As a result, head clogging is therefore liable to take place, and the running durability is also deteriorated.

The average particle size of the inorganic particles is preferably 0.005 to 3 μm, and more preferably 0.05 to 2 μm.

The content of the inorganic particles is usually 0.1 to 20 parts by weight per 100 parts by weight of ferromagnetic powder, and preferably 1 to 10 parts by weight.

It is desirable that the magnetic layers contain carbon black (particularly, carbon black having an average particle size of 10 to 300 nm), in addition to the above-described inorganic particles.

Methods for producing the coating type magnetic recording media of the present invention will hereinafter be described.

The ferromagnetic powder, the binder and the tertiary branched chain fatty acid ester represented by general formula (I) of the present invention, and other fillers and additives, if necessary, are kneaded with a solvent to prepare a magnetic coating. There is no particular restriction on the solvents used in kneading, and solvents usually employed for preparation of magnetic coatings can be used.

There is also no restriction on the methods of kneading, and the order of adding respective components can be determined appropriately by one of skill according to known practices in the field.

When the magnetic coating is prepared, known additives such as a dispersing agent and an antistatic agent can also be used together.

Examples of the dispersing agents include known dispersing agents such as fatty acids having 12 to 22 carbon atoms, salts or ester compounds thereof, compounds obtained by replacing hydrogen atoms of the above compounds partially or wholly with fluorine atoms, amides of the above-described fatty acids, aliphatic amines, higher alcohols, polyalkylene oxide alkyl phosphates, alkyl phosphates, alkyl borates, sarcosinates, alkyl ether esters, trialkyl polyolefins, oxy quaternary ammonium salts and lecithin.

The dispersing agents are usually employed in an amount of 0.1 to 10 parts by weight per 100 parts by weight of ferromagnetic powder to be used.

Examples of the antistatic agents include conductive fine powders such as carbon black and carbon black graft polymers; natural surface active agents such as saponin; nonionic surface active agents such as alkylene oxide series surface active agents, glycerol series surface active agents and glycidol surface active agents; cationic surface active agents such as higher alkylamines, quaternary ammonium salts, salts of heterocyclic compounds such as pyridine, phosphoniums and sulfoniums; anionic surface active agents containing acid groups such as carboxylic acid, phosphoric acid, sulfate groups and phosphate groups; and amphoteric surface active agents such as amino acids, aminosulfonic acids and sulfates or phosphates of aminoalcohols. When the above-described conductive fine powders are used as the antistatic agents, they are used for example, in an amount of 0.1 to 10 parts by weight, based on 100 parts by weight of the ferromagnetic powder, and when the surface active agents are used, they are similarly used in an amount of 0.1 to 10 parts by weight.

The above-described additives such as the dispersing agents, the antistatic agents and the lubricating agents are not particularly limited to only the above-described function and effect. For example, the dispersing agent can also function as the lubricating agent or the antistatic agent. It is therefore understood of course that the function and effect of the compounds exemplified by the above classifications are not limited exclusively to the exemplary functions described in the above classifications. When a material capable of having plural functions and effects is used, the addition amount of the additives can be appropriately adjusted to reflect the multiple functions and effects derived from any single additive.

The above-described non-magnetic support is coated with the magnetic coating thus prepared. Although the non-magnetic support can be coated with the magnetic coating directly, it can also be coated with the magnetic coating through an interlayer such as an adhesive layer. The interlayer used herein is a layer composed of an adhesive composition alone or a composite layer composed of a binder and non-magnetic fine particles such as carbon black dispersed therein.

The binder for the interlayer containing carbon black can be arbitrarily selected from various binders used for magnetic layers. The particle size of carbon black is preferably 10 to 50 nm (nanometers) and the weight ratio of the binder to carbon black is preferably 100:10 to 100:150. The thickness of the interlayer is preferably 0.1 to 2 μm in the case of the sole adhesive layer, and 0.5 to 4 μm in the case of the composite layer containing the non-magnetic powder.

In addition, the interlayer may contain a lubricating agent which is the same as or different from that used in the magnetic layer.

The details of the methods of dispersing the ferromagnetic powders and the binders and the methods of coating the magnetic coatings on the supports are described in JP-A-54-46011 and JP-A-54-21805, and these techniques can also be applied in the practice of the present invention.

The thickness of the magnetic layer thus formed by coating is generally about 0.5 to 10 μm, and desirably 0.7 to 6.0 μm as dry thickness.

When the magnetic recording medium is used in a tape form, the magnetic layer formed on the non-magnetic support is usually subjected to the treatment of orienting the ferromagnetic powder contained in the magnetic layer, namely magnetic orientation treatment, followed by drying. Conversely, in the case of the disklike medium, the magnetic layer is subjected to non-orientation treatment by a magnetic field to remove anisotropy of magnetic characteristics, followed by drying.

The magnetic layer is thereafter subjected to surface smoothing treatment, if necessary, and cut into a desired shape to produce a magnetic recording medium.

The surface of the non-magnetic support on the side on which the magnetic layer is not formed may be provided with a back layer known per se in the art. The back layer is a thin layer composed of, for example, carbon black and a binder in which inorganic filler particles having a Mohs' hardness of 5 or more are dispersed, and having a thickness of 0.6 µm or less.

The thin metal film type magnetic recording media will hereinafter be described.

The thin metal film type magnetic recording media are magnetic recording media free from binders and having thin ferromagnetic metal films as magnetic layers, the films being formed by vapor deposition methods such as vacuum deposition, sputtering and ion plating, or plating methods such as electroplating and electroless plating.

As methods for producing the thin metal film type magnetic recording media, particularly, the vacuum deposit method is advantageous as it does not require waste fluid treatment which is necessary for the plating, the manufacturing processes thereof are also relatively simple, and the deposition rate of films is also high. This method therefore has strong advantages. As methods for producing thin ferromagnetic metal films having coercive force and squareness ratio desirable for magnetic recording media, oblique vacuum deposition methods which are described in U.S. Pat. Nos. 3,342,632 and 3,342,633, can also be applied to the present invention.

Materials of the thin ferromagnetic metal films include ferromagnetic metals such as iron, cobalt and nickel, and ferromagnetic alloys such as Fe—Co, Fe—Ni, Co—Ni, Fe—Rh, Co—P, Co—B, Co—Y, Co—La, Co—Ce, Co—Pt, Co—Sm, Co—Fin, Co—Cr, Fe—Co—Ni, Co—Ni—P, Co—Ni—B, Co—Ni—Ag, Co—Ni—Nd, Co—Ni—Ce, Co—Ni—Zn, Co—Ni—Cu, Co—Ni—W and Co—Ni—Re. These materials are formed into films by vacuum deposition methods. The film thickness thereof is in the range of 0.02 to 2 µm, and preferably in the range of 0.05 to 1.0 µm.

In addition, the above-described thin ferromagnetic metal films may also contain O, N, Cr, Ga, As, Sr, Zr, Nb, No, Rh, Pd, Sn, Sb, Te, Pm, Re, Os, Ir, Au, Hg, Pb, Bi and the like. In particular, it is desirable that the magnetic recording media of the present invention contain oxygen. When oxygen or nitrogen is allowed to be contained, oxygen gas or nitrogen gas is generally introduced while vacuum depositing the metal. In particular, it is preferred to introduce the oxygen gas during vacuum deposition to allow the vicinity (100 Å in thickness) of the surface to contain at least 20% by atom amount of oxygen. It is difficult to introduce oxygen by oxidation treatment after formation of the vacuum-deposited film.

There is no particular restriction on the surface configuration of the magnetic layers described above. However, when the magnetic layers have projections with a height of 10 to 1,000 Å, the running properties and durability are particularly excellent.

The non-magnetic supports of the magnetic recording media of the present invention preferably have a thickness of 4 to 50 µm.

Further, substrate layers may be formed on the supports to improve the adhesion of the thin ferromagnetic metal films and magnetic characteristics.

As the supports used in the present invention, plastic bases such as polyethylene terephthalate, polyimides, polyamides, polyvinyl chloride, cellulose triacetate, polycarbonates, polyethylene naphthalate and polyphenylene sulfide, Al, Ti and stainless steel can be employed.

The surface of the non-magnetic support on the side opposite to the thin ferromagnetic metal layer may be provided with a back layer such as described above for the coating type magnetic recording media.

By using the tertiary branched chain fatty acid esters represented by general formula (I) as the lubricating agents, the magnetic recording media of the present invention are high in storage stability of the lubricating agents themselves, are excellent in the effect of reducing the coefficient of friction, always exhibit stable excellent running durability, and are prevented from being decreased in reproduced output, even under the severe conditions of high temperature and humidity or low temperature and humidity.

The present invention will be described in detail with reference to the following non-limiting examples of the present invention.

In the examples, all parts are by weight.

EXAMPLES

Example 1

Magnetic Coating Composition

| | |
|---|---|
| Ferromagnetic alloy powder | 100 parts |
| (composition: Fe 94%, Zn 4%, Ni 2%; | |
| coercive force: 1,500 Oe; specific | |
| surface area: 54 m²/g) | |
| Polyester polyurethane | 5 parts |
| (weight average molecular weight: 40,000; | |
| number average molecular weight: 25,000; | |
| containing two —SO$_3$Na groups per molecule, | |
| on average) | |
| Vinyl chloride/vinyl acetate/maleic | 12 parts |
| anhydride copolymer | |
| (400 × 110A, manufactured by Nippon Zeon | |
| Co., Ltd.; polymerization degree: 400) | |
| Abrasive material | 5 parts |
| (α-alumina; average particle size: 0.3 µm) | |
| Lubricating agent (see Table A) | |
| Oleic acid | 1 part |
| Carbon black | 2 parts |
| (average particle size: 40 nm) | |
| Methyl ethyl ketone | 300 parts |

After the above-described magnetic coating composition was kneaded for dispersion for 48 hours using a ball mill, 5 parts of a polyisocyanate was added thereto and the mixture was further kneaded for dispersion for 1 hour. The resulting dispersion was subjected to filtration by using a filter having an average pore size of 1 µm to prepare a magnetic coating.

The magnetic coating thus obtained was coated on the surface of a 10 µm-thick polyethylene terephthalate support by the use of a reverse roll so as to give a thickness of 4.0 μm after drying.

Then, orientation was conducted in a wet condition by a 3,000G magnet. After drying, super calender treatment was carried out, followed by slitting to a width of 8 mm to produce a 8 mm video tape. Samples 1 to 4 and Comparative Samples A to D were prepared in this manner and then evaluated as described below.

The reproduced output after storage under the circumstances of high temperature and humidity was measured by the following measuring method to determine the storage stability of each video tape thus obtained. Further, the coefficient of friction (namely, μ value) of each video tape to a stainless bar was measured by the following measuring method to determine the running durability under the circumstances of high temperature and humidity, and of low temperature and humidity.

Measurement of Reproduced Output

The resulting video tape was stored in the atmosphere of 60° C. and 85% RH for 20 days. Then, a 7 MHz signal was recorded thereon by using a commercial 8 mm video tape recorder (Fujix-8 manufactured Fuji Photo Film Co., Ltd.) and reproduced. The relative reproduced output of each video tape in taking the reproduced output of 7 MHz recorded on a standard tape (Comparative Sample A) as 0 dB was measured.

Measurement of the Coefficient of Friction

The resulting video tape was brought into contact with a stainless pole at a tension ($T_1$) of 50g (at a contact angle of 180°). Under these conditions, a tension ($T_2$) required to run the video tape at a speed of 3.3 cm/second was measured. The coefficient of friction ($\mu$) of the video tape was calculated from the following calculating equation, based on this measured value:

$$\mu = \frac{1}{\pi} \ln\left(\frac{T_1}{T_2}\right)$$

The coefficient of friction was measured under the following two conditions:
Condition a; 40° C., 85% RH
Condition b; 5° C., 10% RH
The results are shown in Table 1.

TABLE 1

| Sample No. | Lubricating Agent Kind | Addition Amount (part) | Reproduced Output (dB) | Coefficient of Friction Condition a 40° C. 85% | Coefficient of Friction Condition b 5° C. 10% |
|---|---|---|---|---|---|
| 1 | Heptyl neopentanoate | 1 | +1.0 | 0.20 | 0.20 |
| 2 | Lauryl neononanoate | 1 | +1.0 | 0.20 | 0.20 |
| 3 | 2-Decyl tetradecyl neohexadecanoate | 1 | +1.0 | 0.21 | 0.24 |
| 4 | Cetyl neotridecanoate | 1 | +0.5 | 0.20 | 0.21 |
| A | Butyl stearate | 1 | 0 | 0.36 | 0.25 |
| B | Lauryl stearate | 1 | 0 | 0.33 | 0.29 |
| C | Ester α for comparison | 1 | 0 | 0.36 | 0.40 |
| D | Ester β for comparison | 1 | 0 | 0.39 | 0.36 |

Sample Nos. 1 to 4 are examples of the present invention, and Sample Nos. A to D are comparative examples. Sample No. C corresponds to JP-A-58-218038, and Sample No. D corresponds to JP-A-63-261526.

Ester α for Comparison:

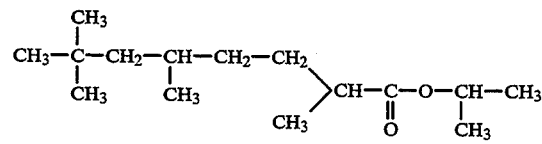

Ester β for Comparison:

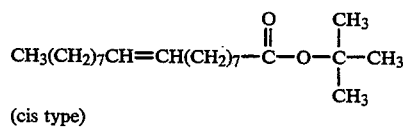

(cis type)

Example 2

Magnetic Coating Composition

| | |
|---|---|
| Ferromagnetic alloy powder (composition: Fe 94%, Zn 4%, Ni 2%; coercive force: 1,500 Oe; specific surface area: 54 m²/g | 100 parts |
| Polyester polyurethane (weight average molecular weight: 40,000; number average molecular weight: 25,000; containing two —SO₃Na groups per molecule, on average) | 5 parts |
| Vinyl chloride/vinyl acetate/maleic anhydride copolymer (400 × 110A, manufactured by Nippon Zeon Co., Ltd.; polymerization degree: 400) | 12 parts |
| Abrasive material (α-alumina; average particle size: 0.3 μm) | 5 parts |
| Carbon black (average particle size: 40 nm) | 2 parts |
| Methyl ethyl ketone | 300 parts |

After the above-described magnetic coating composition was kneaded for dispersion for 48 hours using a ball mill, 5 parts of a polyisocyanate was added thereto and the mixture was further kneaded for dispersion for 1 hour. The resulting dispersion was subjected to filtration by using a filter having an average pore size of 1 μm to prepare a magnetic coating.

The magnetic coating thus obtained was coated on the surface of a 10 μm-thick polyethylene terephthalate support by the use of a reverse roll so as to give a thickness of 4.0 μm after drying.

Then, orientation was conducted in a wet condition by a 3,000G magnet. After drying, super calender treatment was carried out to obtain a coating type magnetic recording medium.

A methyl ethyl ketone solution of each lubricating agent shown in Table 2 (the concentration of each lubricating agent: 0.2% by weight) was coated on the surface of the magnetic layer of this coating type magnetic recording medium by using a bar coater, and dried. The coated amount of the solution was adjusted so as to give 30 mg/m² of the lubricating agent after drying.

Then, the magnetic recording medium was slit to a width of 8 mm to produce a 8 mm video tape. Sample 5 and Comparative Samples E to G were prepared in this manner.

The reproduced output and the coefficient of friction of each video tape thus obtained were measured in the same manner as with Example 1. In this case, the tape of Comparative Example E was used as the standard tape.

The results are shown in Table 2.

TABLE 2

| Sample No. | Lubricating agent | Reproduced Output (Db) | Coefficient of Friction Condition a 40° C. 85% | Coefficient of Friction Condition b 5° C. 10% |
| --- | --- | --- | --- | --- |
| 5 | Cetyl neotridecanoate | +0.5 | 0.20 | 0.19 |
| E | Butyl stearate | 0 | 0.35 | 0.26 |
| F | Ester α for comparison | 0 | 0.37 | 0.45 or more |
| G | Ester β for comparison | 0 | 0.39 | 0.38 |

Sample No. 5 is an example of the present invention, and Sample Nos. E to G are comparative examples. Sample No. F corresponds to JP-A-58-218038, and Sample No. G corresponds to JP-A-63-261526.

As ester α for comparison and ester β for comparison, the same compounds as used in Example 1 were employed.

Example 3

A thin ferromagnetic cobalt-nickel metal film (having a thickness of 150 nm) was formed on the surface of a 13 μm-thick polyethylene terephthalate film in a stream of oxygen by oblique vacuum deposition to prepare an original sheet of a thin metal film type magnetic recording medium. An electron beam evaporation source was used as an evaporation source, which was charged with a cobalt-nickel alloy (Co: 80% by weight and Ni: 20% by weight), and oblique vacuum deposition was conducted at a degree of vacuum of $5 \times 10^{-5}$ Torr in a stream of oxygen at an angle of incidence of 50 degrees.

A methyl ethyl ketone solution of each lubricating agent shown in Table 2 (the concentration of each lubricating agent: 0.15% by weight) was coated on the surface of the thin ferromagnetic metal film of this thin metal film type magnetic recording medium by using a bar coater, and dried. The coated amount of the solution was adjusted so as to give 20 mg/m² of the lubricating agent after drying.

Then, the magnetic recording medium was slit to a width of 8 mm to produce a 8 mm video tape. Samples 6 and 7 and Comparative Samples H to J were prepared in this manner.

The reproduced output and the coefficient of friction of each video tape thus obtained were measured in the same manner as with Example 1. In this case, the tape of Comparative Example H was used as the standard tape.

The results are shown in Table 3.

TABLE 3

| Sample No. | Lubricating agent | Reproduced Output (dB) | Coefficient of Friction Condition a 40° C. 85% | Coefficient of Friction Condition b 5° C. 10% |
| --- | --- | --- | --- | --- |
| 6 | Cetyl neotridecanoate | 0 | 0.21 | 0.20 |
| 7 | Lauryl neononanoate | 0 | 0.22 | 0.21 |
| H | Butyl stearate | 0 | 0.39 | 0.35 |
| I | Ester α for comparison | 0 | 0.37 | 0.45 or more |
| J | Ester β for comparison | 0 | 0.39 | 0.39 |

Sample Nos. 6 and 7 are examples of the present invention, and Sample Nos. H to J are comparative examples. Sample No. I corresponds to JP-A-58-218038, and Sample No. J corresponds to JP-A-63-261526.

As ester α for comparison and ester β for comparison, the same compounds as used in Example 1 were employed.

As is apparent from the results shown in Tables 1 and 2, for the coating type magnetic recording media, all of the samples in which the tertiary branched chain fatty acid esters of the present invention are used are stable in reproduced output after storage under the environmental conditions of high temperature and humidity, and a low coefficient of friction can be obtained even under the severe environmental conditions of high temperature and humidity or low temperature and humidity.

On the other hand, the results reveal that all of the samples in which the conventionally known fatty acid esters are used are low in reproduced output and that the coefficient of friction is high under the environmental conditions of high temperature and humidity or low temperature and humidity, which results in problems. In particular, there is the problem that the coefficient of friction is markedly high under conditions of high temperature and humidity.

Further, the results reveal that all of the samples in which the fatty acid esters described in JP-A-58-218038 and JP-A-63-261526 are used are high in the coefficient of friction under the conditions of high temperature and humidity, and particularly that the ester described in JP-A-58-218038 causes an increase in the coefficient of friction under the conditions of low temperature and humidity.

The above results show that the present invention demonstrates excellent effects which could not be expected from JP-A-58-218038 and JP-A-63-261526.

As is also apparent from the results shown in Table 3, for the thin metal film type magnetic recording media, the use of the tertiary branched chain fatty acid esters of the present invention provides a stable reproduced output and a low coefficient of friction even under the severe environmental conditions of high temperature and humidity or low temperature and humidity.

On the other hand, the results reveal that all of the samples in which the previously known fatty acid esters (for example, the fatty acid esters described in JP-A-58-218038 and JP-A-63-261526) are high in the coefficient of friction under the environmental conditions of high temperature and humidity or low temperature and humidity, which results in problems.

The above results show that the present invention demonstrates excellent effects which could not be expected #rom JP-A-58-218038 and JP-A-63-261526, for both the thin metal film type magnetic recording media and with the coating type magnetic recording media.

Further, the thin metal film type magnetic recording media having excellent high density recording characteristics have smoother and thinner magnetic layers compared to the coating type magnetic recording media, so that providing particularly excellent running durability is an important concern in that type of maintaining media. From this standpoint, the present invention also meets these heightened demands.

While the invention has been described in denail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having a magnetic recording layer formed thereon, wherein said magnetic recording layer mainly contains a ferromagnetic powder and a binder, and said binder comprises at least one resin containing at least one polar group selected from the group consisting of an epoxy group, $-NH_2$, $-OH$, $-COOM$, $-SO_3M$, $-OSO_3M$, $-PO_3M_2$ and $-OPO_3M_2$ in an amount of $1 \times 10^{-3}$ to $1 \times 10^{-7}$ equivalent per g of said binder, wherein each M independently represents a hydrogen atom, an alkali metal or substituted or unsubstituted ammonium, and wherein said at least one resin is present in said magnetic recording layer in an amount of 5% by weight or more of total amount of said binder, and wherein said magnetic recording layer further contains a tertiary branched chain fatty acid ester represented by formula (I) and a lubricating agent different in chemical structure from said tertiary branched chain fatty acid ester:

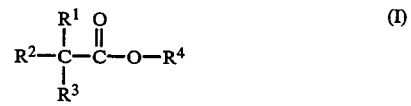

wherein each of $R^1$, $R^2$ and $R^3$ independently represents a hydrocarbon group having 1 to 18 carbon atoms, and $R^4$ represents a hydrocarbon group having 1 to 24 carbon atoms, and total number of carbon atoms in said tertiary branched chain fatty acid ester is 12 to 40, and said tertiary branched chain fatty acid ester is present in an amount of from 0.5 to 3.0% by weight based on amount of ferromagnetic powder, and wherein said different lubricating agent is selected from the group consisting of myristic acid, stearic acid and oleic acid, and is present in an amount of from 0.1 to 2 times the amount of said tertiary branched chain fatty acid ester.

2. The magnetic recording medium as in claim 1, wherein said total number of carbon atoms in said tertiary branched chain fatty acid ester is from 12–36.

3. The magnetic recording medium as in claim 1, wherein said tertiary branched chain fatty acid ester is selected from the group consisting of heptyl neopentanoate, lauryl neononanoate, 2-decyltetradecyl neohexadecanoate and cetyl neotridecanoate.

4. The magnetic recording medium as in claim 1, wherein said tertiary branched chain fatty acid ester has a molecular weight of 340 or more and solidifying point of 25° C. or less.

* * * * *